(12) United States Patent
Karube et al.

(10) Patent No.: US 9,693,134 B2
(45) Date of Patent: Jun. 27, 2017

(54) WATERPROOF SOUND-TRANSMITTING MEMBER

(71) Applicant: NITTO DENKO CORPORATION, Ibaraki-shi, Osaka (JP)

(72) Inventors: Yuki Karube, Osaka (JP); Tsuyoshi Kashima, Osaka (JP); Yuri Horie, Osaka (JP); Yuichi Abe, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/803,863

(22) Filed: Jul. 20, 2015

(65) Prior Publication Data
US 2017/0026742 A1 Jan. 26, 2017

(51) Int. Cl.
H04R 1/44 (2006.01)

(52) U.S. Cl.
CPC ..................................... H04R 1/44 (2013.01)

(58) Field of Classification Search
CPC . H04R 1/00; H04R 1/086; H04R 1/44; H04R 2499/11; H04R 7/10; H04M 1/18; H04M 1/03
See application file for complete search history.

(56) References Cited

U.S. PATENT DOCUMENTS

| 4,071,040 | A |  | 1/1978 | Moriarty |  |
|---|---|---|---|---|---|
| 4,949,386 | A |  | 8/1990 | Hill |  |
| 4,987,597 | A |  | 1/1991 | Haertl |  |
| 5,412,162 | A |  | 5/1995 | Kindel |  |
| 5,828,012 | A | * | 10/1998 | Repolle | H04R 1/023 181/175 |
| 6,512,834 | B1 | * | 1/2003 | Banter | H04R 1/086 381/189 |
| 6,893,711 | B2 |  | 5/2005 | Williamson et al. |  |
| 6,932,187 | B2 |  | 8/2005 | Banter et al. |  |
| 7,561,684 | B2 | * | 7/2009 | Tsutaichi | H04M 1/18 379/433.01 |
| 8,587,934 | B2 | * | 11/2013 | Aihara | G03B 17/08 206/320 |
| 8,687,828 | B2 | * | 4/2014 | Otani | H04R 1/023 181/149 |
| 8,942,401 | B2 | * | 1/2015 | Murayama | G01M 3/26 381/332 |
| 2005/0077102 | A1 | * | 4/2005 | Banter | H04R 1/086 181/149 |
| 2005/0220448 | A1 |  | 10/2005 | Tei et al. |  |

(Continued)

FOREIGN PATENT DOCUMENTS

| JP | 10-165787 | 6/1998 |
|---|---|---|
| JP | 2003-053872 | 2/2003 |

(Continued)

Primary Examiner — Brenda Bernardi
(74) Attorney, Agent, or Firm — Hamre, Schumann, Mueller & Larson, P.C.

(57) ABSTRACT

A waterproof sound-transmitting member includes a waterproof sound-transmitting membrane and a support layer. The support layer includes a polyolefin-based resin foam. The support layer has a loss modulus of $1.0 \times 10^7$ Pa or less and a loss factor of $1.0 \times 10^{-1}$ or more. The waterproof sound-transmitting membrane is, for example, a stretched porous polytetrafluoroethylene membrane. The waterproof sound-transmitting membrane may include an adhesive layer.

7 Claims, 3 Drawing Sheets

(56) References Cited

U.S. PATENT DOCUMENTS

| | | | |
|---|---|---|---|
| 2009/0320979 A1 | 12/2009 | Keleny et al. | |
| 2010/0206660 A1* | 8/2010 | Horie | B29C 47/0021 181/175 |
| 2010/0247857 A1* | 9/2010 | Sanami | H04M 1/18 428/138 |
| 2010/0303270 A1 | 12/2010 | Parkins | |
| 2011/0117304 A1* | 5/2011 | Ueki | H04R 1/023 428/36.5 |
| 2013/0032285 A1 | 2/2013 | Mietta et al. | |
| 2013/0333978 A1* | 12/2013 | Abe | G10K 11/002 181/291 |
| 2014/0079268 A1* | 3/2014 | Karube | H04R 1/02 381/334 |
| 2014/0138181 A1* | 5/2014 | Mori | G10K 11/18 181/292 |
| 2014/0294217 A1* | 10/2014 | Yamaguchi | H04M 1/035 381/334 |
| 2014/0332310 A1* | 11/2014 | Seo | B32B 7/12 181/211 |
| 2016/0212526 A1* | 7/2016 | Salvatti | H04R 1/44 |

FOREIGN PATENT DOCUMENTS

| | | |
|---|---|---|
| JP | 2004-083811 | 3/2004 |
| JP | 2008-245332 | 10/2008 |

\* cited by examiner

WATERPROOF SOUND-TRANSMITTING MEMBER

BACKGROUND OF THE INVENTION

1. Field of the Invention

The present invention relates to a waterproof sound-transmitting member including a waterproof sound-transmitting membrane.

2. Description of Related Art

In electronic devices equipped with audio devices, such as mobile phones, cordless phones, and video cameras, the audio devices are mounted in housings. Such a housing has an opening for allowing sound to pass through. In order to prevent water from entering the housing through the opening, a waterproof sound-transmitting membrane that allows sound to pass through but prevents water from passing through is attached to the opening. JP 2008-245332 A discloses a porous polytetrafluoroethylene (PTFE) membrane as a waterproof sound-transmitting membrane.

SUMMARY OF THE INVENTION

However, when a waterproof sound-transmitting member including a waterproof sound-transmitting membrane is subjected to a sound transmission test, distortion of sound is often observed. As used herein, distortion of sound is the deterioration of sound quality that occurs more notably in the presence of a waterproof sound-transmitting membrane attached to an opening of a housing than in the absence of the waterproof sound-transmitting membrane attached thereto. Distortion of sound is perceived, for example, as chattering noise (vibration noise like sound of fluttering shoji paper (paper for paper screen) by the human ear. When sound passes through the waterproof sound-transmitting membrane, high-order harmonics, whose frequencies are integer multiples of the fundamental frequency which is the same as the frequency of an input wave (sine wave), are generated. The distortion of sound is quantified by the harmonic distortion, which corresponds to the sum of the higher-order harmonics as distortion components. An increase in distortion of sound is a serious problem for electronic devices, and high-quality electronic devices, in particular, are required to accurately reproduce undistorted sound.

It is an object of the present invention to provide a waterproof sound-transmitting member with reduced distortion of transmitted sound.

The present invention provides a waterproof sound-transmitting member including: a waterproof sound-transmitting membrane; and a support layer joined to at least one surface of the waterproof sound-transmitting membrane. The support layer includes a polyolefin-based resin foam, and the support layer has a loss modulus of $1.0 \times 10^7$ Pa or less and a loss factor of $1.0 \times 10^{-1}$ or more.

According to the present invention, it is possible to provide a waterproof sound-transmitting member with reduced distortion of transmitted sound.

DETAILED DESCRIPTION OF THE INVENTION

Hereinafter, embodiments of the present invention are described with reference to the accompanying drawings.

Figure 1:
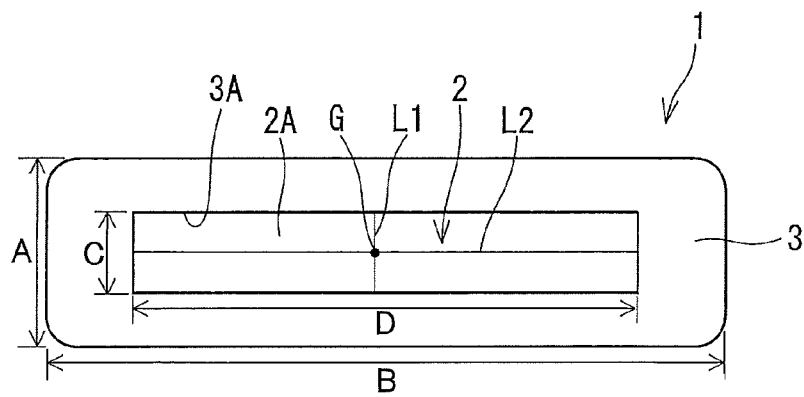
FIG. 1 is a plan view schematically showing an example of a waterproof sound-transmitting member of the present invention.
Figure 2:
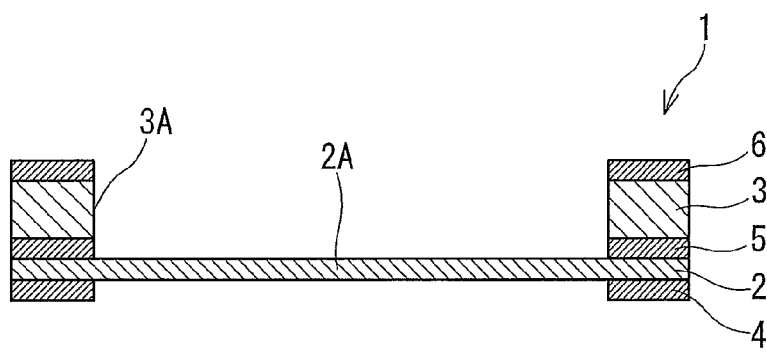
FIG. 2 is a cross-sectional view schematically showing the example of the waterproof sound-transmitting member of the present invention.

FIG. 1 is a plan view of a waterproof sound-transmitting member 1 of the present embodiment. FIG. 2 is a cross-sectional view of the waterproof sound transmitting member 1. A third adhesive layer 6 is not shown in FIG. 1. The waterproof sound-transmitting member 1 includes a waterproof sound-transmitting membrane 2, a support layer 3, a first adhesive layer 4, a second adhesive layer 5, and the third adhesive layer 6. The waterproof sound-transmitting membrane 2 is a membrane that allows sound to pass through but prevents water from passing through. It is only necessary that the support layer 3 be joined to at least one surface of the waterproof sound-transmitting membrane 2. In the present embodiment, the support layer 3 is joined to only one of the surfaces of the waterproof sound-transmitting membrane 2 (i.e., the upper surface thereof in FIG. 2). The second adhesive layer 5 is provided on the one surface of the waterproof sound-transmitting membrane 2 (i.e., the upper surface thereof in FIG. 2) to join the support layer 3 to the waterproof sound-transmitting membrane 2. The third adhesive layer 6 is provided on one surface of the support layer 3 (i.e., the upper surface thereof in FIG. 2) to join the support layer 3 to a housing. The first adhesive layer 4 is provided on the other surface of the waterproof sound-transmitting membrane 2 (i.e., the lower surface thereof in FIG. 2) to join the waterproof sound-transmitting membrane 2 to an audio device (such as a microphone 33 shown in FIG. 6 or a speaker 45 shown in FIG. 7). The waterproof sound-transmitting member 1 is formed by stacking the third adhesive layer 6, the support layer 3, the second adhesive layer 5, the waterproof sound-transmitting membrane 2, and the first adhesive layer 4 in this order.

Figure 3:
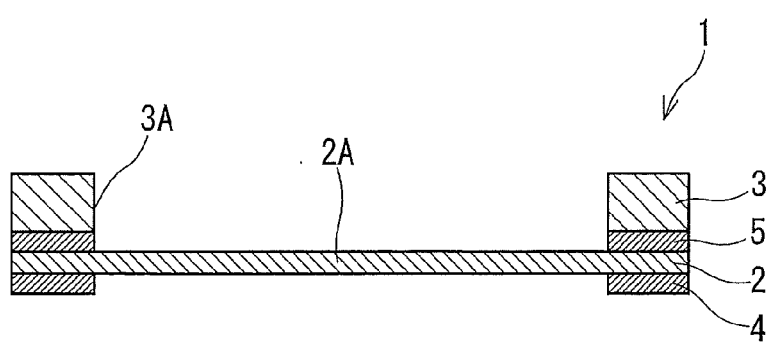
FIG. 3 is a cross-sectional view schematically showing an example of a waterproof sound-transmitting member according to a modification of the present invention.
Figure 4:
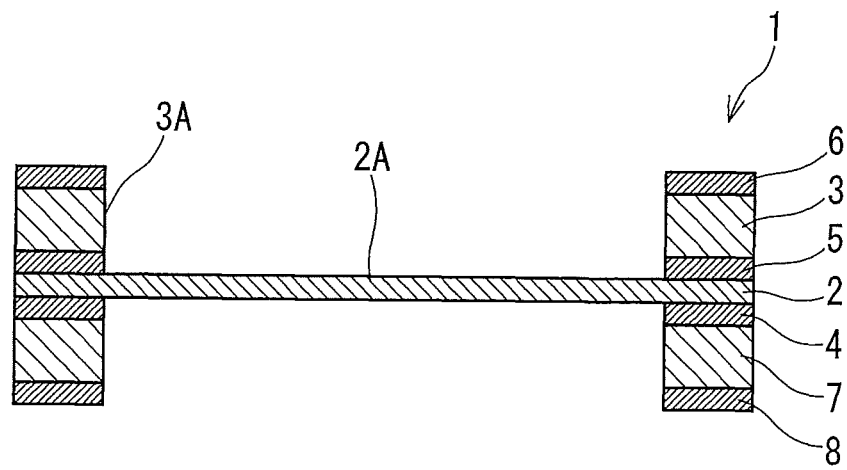
FIG. 4 is a cross-sectional view schematically showing an example of a waterproof sound-transmitting member according to another modification of the present invention.
Figure 5:
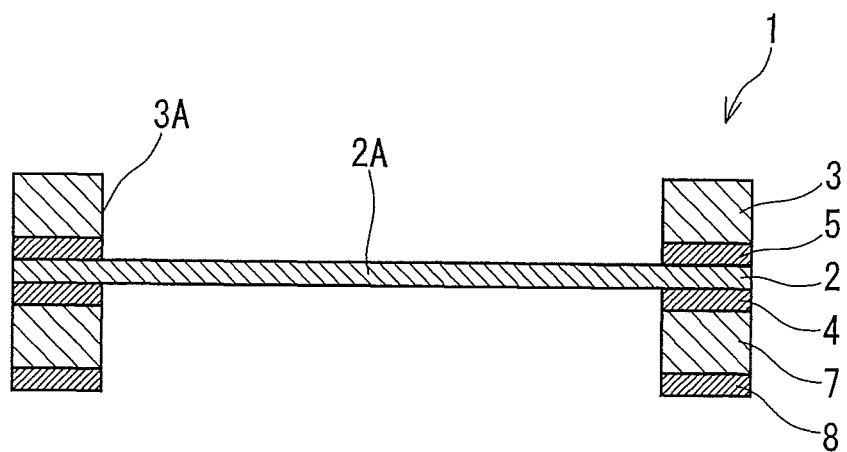
FIG. 5 is a cross-sectional view schematically showing an example of a waterproof sound-transmitting member according to still another modification of the present invention.

As shown in FIG. 3, the waterproof sound-transmitting member 1 may be configured without the third adhesive layer 6. As shown in FIG. 4, the waterproof sound-transmitting member 1 may further include the second support layer 7 and the fourth adhesive layer 8 on the first adhesive layer 4. The second support layer 7 is joined to the other surface of the waterproof sound-transmitting membrane 2 (i.e., the lower surface thereof in FIG. 4). The first adhesive layer 4 is provided on the other surface of the waterproof sound-transmitting membrane 2 (i.e., the lower surface thereof in FIG. 4) to join the waterproof sound-transmitting membrane 2 to one surface of the second support layer 7. The fourth adhesive layer 8 is provided on the other surface of the second support layer 7 (i.e., the lower surface thereof in FIG. 4) to join the second support layer 7 to the audio device (such as the microphone 33 shown in FIG. 6 or the speaker 45 shown in FIG. 7). As shown in FIG. 5, the waterproof sound-transmitting member 1 may be configured by removing the third adhesive layer 6 from the configuration shown in FIG. 4.

As shown in FIG. 1, the outer periphery of the waterproof sound-transmitting membrane 2 defines a rectangular region having long sides and short sides. The outer periphery of the support layer 3 coincides with the outer periphery of the waterproof sound-transmitting membrane 2, as viewed in a direction in which sound is transmitted. The support layer 3 has a frame-like shape with an opening 3A in the center thereof. When a shortest line segment passing through the center of gravity G of the opening 3A and connecting two points on the inner periphery of the support layer 3 surrounding the opening 3A is defined as a first line segment L1 and a line segment passing through the center of gravity G of the opening 3A, perpendicular to the first line segment L1, and connecting two points on the inner periphery of the support layer 3 surrounding the opening 3A is defined as a second line segment L2, the second line segment L2 has a length at least twice the length of the first line segment L1. The length of the second line segment L2 may be at least three times or even five times the length of the first line segment L1. The inner periphery of the support layer 3 surrounding the opening 3A defines a rectangular region having first sides parallel to the first line segment L1 and second sides parallel to the second line segment L2. The length of the first sides is equal to the length of the first line segment L1, and the length of the second sides is equal to the length of the second line segment L2. The waterproof sound-transmitting membrane 2 has a sound-transmitting region 2A exposed through the opening 3A. Sound having passed through the waterproof sound-transmitting membrane 2 having a region exposed through the opening 3A with a higher ratio of L2/L1, that is, sound having passed through the waterproof sound-transmitting membrane 2 having a region exposed through the narrower opening 3A, tends to contain more distortion components. Therefore, the improving effect of the present invention is more clearly observed in such a sound-transmitting member. The outer peripheries of the first adhesive layer 4, the second adhesive layer 5, and the third adhesive layer 6 coincide with the outer periphery of the waterproof sound-transmitting membrane 2, as viewed in the direction in which sound is transmitted. The first adhesive layer 4, the second adhesive layer 5, and the third adhesive layer 6 each have a frame-like shape with an opening in the center thereof, and the inner peripheries of the adhesive layers 4, 5 and 6 surrounding the openings coincide with the inner periphery of the support layer 3 surrounding the opening 3A, as viewed in the direction in which sound is transmitted.

In the present embodiment, as viewed in the direction in which sound is transmitted, the outer periphery of the support layer 3 coincides with the outer periphery of the waterproof sound-transmitting membrane 2 but does not necessarily have to coincide with the outer periphery of the waterproof sound-transmitting membrane 2. For example, the entire outer periphery of the waterproof sound-transmitting membrane 2 may be located closer to the center of gravity G of the opening 3A than the outer periphery of the support layer 3, that is, the entire outer periphery of the waterproof sound-transmitting membrane 2 may be located within the outer periphery of the support layer 3, as long as the waterproof sound-transmitting membrane 2 can cover the opening 3A. In the present embodiment, as viewed in the direction in which sound is transmitted, the inner periphery of the support layer 3 surrounding the opening 3A defines a rectangular region but the shape of the region defined by the inner periphery of the support layer 3 is not limited to a rectangular shape. For example, it may be an approximately rectangular shape with rounded corners and with first sides and second sides as described above. Typically, the opening 3A has a rectangular or an approximately rectangular shape. The shape of the opening 3A is not limited to a rectangular shape, and may be another shape such as an elliptical shape.

The length A of the short side of the outer periphery of the waterproof sound-transmitting membrane 2 is preferably in a range of 1.0 mm or more and 30 mm or less, and the length B of the long side of the outer periphery of the waterproof sound-transmitting membrane 2 is preferably in a range of 1.0 mm or more and 30 mm or less. The length C of the short side of the inner periphery of the support layer 3 surrounding the opening 3A is preferably in a range of 0.5 mm or more and 28 mm or less, and the length D of the long side of the inner periphery of the support layer 3 surrounding the opening 3A is preferably in a range of 0.5 mm or more and 28 mm or less. The length D may be at least twice, even at least three times, or particularly at least five times the length C. In the case where the outer periphery of the support layer 3 and the inner periphery of the support layer 3 surrounding the opening 3A each have a shape other than a rectangular shape (such as an elliptical shape), the above lengths A to D are determined based on a minimum-area circumscribed rectangle of that other shape. For example, in FIG. 1, the lengths A and B are determined based on the circumscribed minimum-area rectangle.

The case where the opening 3A has a rectangular or elliptical shape has been described, but the present invention can also be applied to a waterproof sound-transmitting member including a support layer having a circular or square opening, as viewed in the direction in which sound is transmitted.

A polymer material is suitable for use as a material of the waterproof sound-transmitting membrane 2. Examples of the suitable polymer material include polyethylene (PE), polyimide (PI), polypropylene (PP), polyethylene terephthalate (PET), and polytetrafluoroethylene (PTFE). Preferably, the waterproof sound-transmitting membrane 2 is made of a fluorine-containing resin. Specifically, the waterproof sound-transmitting membrane 2 is particularly preferably a stretched porous polytetrafluoroethylene membrane. The waterproof sound-transmitting membrane 2 may be a nonwoven fabric, or may be formed by assembling nanofibers. The waterproof sound-transmitting membrane 2 may be subjected to water-repellent treatment.

The support layer 3 is joined to the waterproof sound-transmitting membrane 2 to increase the stiffness of the waterproof sound-transmitting member 1. That is, the support layer 3 has the effect of stabilizing the shape of the waterproof sound-transmitting member 1. In the present embodiment, the support layer 3 has a film-like shape. In the present embodiment, the material of the support layer 3 is a polyolefin-based resin foam. As the polyolefin-based resin foam, a resin foam containing, as a resin component, only a polyolefin resin such as polyethylene (PE) or polypropylene (PP) may be used. However, the polyolefin-based resin foam may be a foam containing, as a resin component, a mixture of a polyolefin resin and an elastomer component such as rubber or thermoplastic elastomer, in view of its cushioning property, flexibility, a high expansion ratio, etc. The polyolefin-based resin foam has a large surface area and has high sound absorbing properties. Therefore, the polyolefin-based resin foam absorbs high-order harmonics as distortion components sufficiently, and thus is suitable for reducing distortion of sound.

The support layer 3 is configured to have a loss modulus of $1.0 \times 10^7$ Pa or less as measured according to JIS K 7244-3 (Method A) and a loss factor of $1.0 \times 10^{-1}$ or more as measured according to JIS K 7244-3 (Method A). Therefore, the storage modulus of the support layer 3 is $1.0 \times 10^8$ Pa or less. The storage modulus (E') represents the elastic component of a viscoelastic material under strain. The loss modulus (E") represents the viscous component of the viscoelastic material under strain. The loss factor (tan δ) is the ratio of the viscous component of the viscoelastic material under strain to the elastic component of the viscoelastic material under strain. Thus, the following relation holds: Loss factor (tan δ)=Loss modulus (E")/Storage modulus (E'). Preferably, the loss modulus of the support layer 3 is in a range of $1.0 \times 10^2$ Pa or more and $1.0 \times 10^7$ Pa or less. Preferably, the loss factor of the support layer 3 is in a range of 0.1 or more and 1.0 or less. Preferably, the storage modulus of the support layer 3 is in a range of $1.0 \times 10^2$ Pa or more and $1.0 \times 10^8$ Pa or less.

The polyolefin-based resin foam having a loss modulus of $1.0 \times 10^7$ Pa or less can reduce distortion of sound caused by the deformation of the waterproof sound-transmitting member 1 when sound passes therethrough. Furthermore, the polyolefin-based resin foam having a loss factor of $1.0 \times 10^{-1}$ or more absorbs much vibration energy when sound passes through the waterproof sound-transmitting member 1. As a result, the absorption of high-order harmonics is improved and thus the distortion of the sound can further be reduced.

As the first adhesive layer 4, the second adhesive layer 5, and the third adhesive layer 6, for example, double-sided adhesive tapes containing an acrylic or silicone adhesive agent are used. Alternatively, the first adhesive layer 4, the second adhesive layer 5, and the third adhesive layer 6 may each consist of such an adhesive agent.

Figure 6:
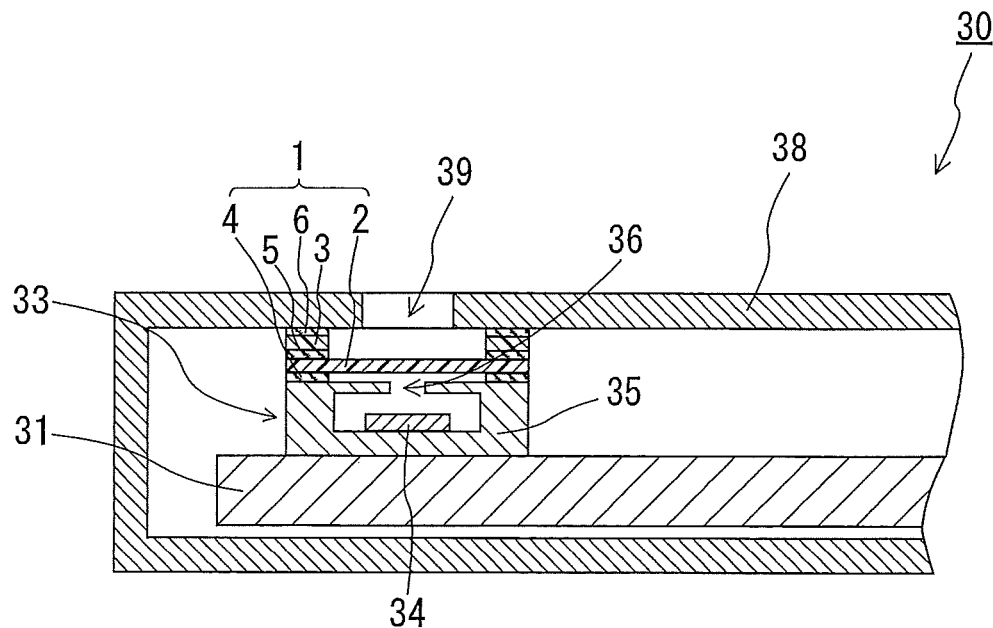
FIG. 6 is a cross-sectional view schematically showing an example of an electronic device including the waterproof sound-transmitting member of the present invention.

FIG. 6 shows a mobile phone 30 as an example of an electronic device including the waterproof sound-transmitting member 1.

A microphone 33 is disposed in a housing 38 of the mobile phone 30. The housing 38 has a first sound collecting hole 39 for introducing external sound to the microphone 33. A sound collecting portion 34 for converting sound into electric signals is disposed in a package 35 of the microphone 33. The package 35 has a rectangular parallelepiped hollow space therein. The package 35 has, in one surface thereof, a second sound collecting hole 36 for introducing, to the sound collecting portion 34 of the microphone 33, the sound introduced into the housing 38 through the first sound collecting hole 39 thereof. The first sound collecting hole 39 and the second sound collecting hole 36 are separated from each other by the waterproof sound-transmitting membrane 2, but their locations are such that the sound can be transmitted from the first sound collecting hole 39 to the second sound collecting hole 36 through the waterproof sound-transmitting membrane 2. The microphone 33 is connected electrically to a circuit board 31 of the mobile phone 30 by terminals (not shown) provided on the bottom of the package 35. The electric signal converted from the sound by the sound collecting portion 34 is outputted to the circuit board 31 via the terminals. In the mobile phone 30, the waterproof sound-transmitting membrane 2 disposed so as to separate the first sound collecting hole 39 and the second sound collecting hole 36 allows sound to be transmitted to the sound collecting portion 34 of the microphone 33 while preventing foreign matters such as dust and water from entering the sound collecting portion 34 through the first sound collecting hole 39 and the second sound collecting hole 36. Thereby, it is possible to maintain the performance of the microphone 33 while preventing generation of noise and occurrence of failure in the microphone 33.

EXAMPLES

Example 1

A stretched porous PTFE sheet (NTF 610AP manufactured by Nitto Denko Corporation) and a polyolefin-based resin foam sheet (SCF (registered trademark) 300 manufactured by Nitto Denko Corporation) were each cut into a shape shown in FIG. 1 using a Thompson die-cutter so as to obtain a waterproof sound-transmitting membrane and a support layer having the following dimensions: the length A of the short sides of the outer peripheries of the waterproof sound-transmitting membrane and the support layer: 7 mm; the length B of the long sides of the outer peripheries of the waterproof sound-transmitting membrane and the support layer: 25 mm; the length C of the short sides of the inner periphery of the support layer surrounding the opening: 2.8 mm; and the length D of the long sides of the inner periphery of the support layer surrounding the opening: 19.8 mm. A first double-sided adhesive tape, the support layer, a second double-sided adhesive tape, the waterproof sound-transmitting membrane, and a third double-sided adhesive tape were stacked in this order. Thus, a waterproof sound-transmitting member configured as shown in FIG. 2 was obtained. The thickness of the first to third double-sided adhesive tapes was 0.05 mm, and their base material was PET.

Example 2

A waterproof sound-transmitting member was obtained in the same manner as in Example 1, except that SCF (registered trademark) 400 (manufactured by Nitto Denko Corporation) was used as a polyolefin-based resin foam sheet.

Example 3

A waterproof sound-transmitting member was obtained in the same manner as in Example 1, except that SCF (registered trademark) 500 (manufactured by Nitto Denko Corporation) was used as a polyolefin-based resin foam sheet.

Comparative Example 1

A waterproof sound-transmitting member was obtained in the same manner as in Example 1, except that an urethane-based resin foam sheet PORON (registered trademark) SR-S 40P (manufactured by Rogers Inoac Corporation) was used instead of a polyolefin-based resin foam sheet.

Comparative Example 2

A waterproof sound-transmitting member was obtained in the same manner as in Example 1, except that an urethane-based resin foam sheet PORON (registered trademark) SR-S 48P (manufactured by Rogers Inoac Corporation) was used instead of a polyolefin-based resin foam sheet.

Comparative Example 3

A waterproof sound-transmitting member was obtained in the same manner as in Example 1, except that an urethane-based resin foam sheet PORON (registered trademark) SR-S 70P (manufactured by Rogers Inoac Corporation) was used instead of a polyolefin-based resin foam sheet.

For each of the waterproof sound-transmitting members of Examples 1 to 3 and Comparative Examples 1 to 3, the storage modulus, the loss modulus, the loss factor, and the harmonic distortion were examined in the following manner.

[Storage Modulus, Loss Modulus, and Loss Factor]

The storage modulus, the loss modulus, and the loss factor of the material of the support layer were measured using a dynamic viscoelasticity measurement device (RSA-G2 manufactured by TA Instruments, Japan). This dynamic viscoelasticity measurement device was in conformity with JIS K 7244-3 (Method A). The storage modulus, the loss modulus, and the loss factor of the material of the support layer were measured using a test sample thereof at an oscillation frequency of 1000 Hz and a test temperature of 20° C. to 30° C.

[Harmonic Distortion]

The harmonic distortion in each waterproof sound-transmitting member was measured in the following manner.

Figure 7:
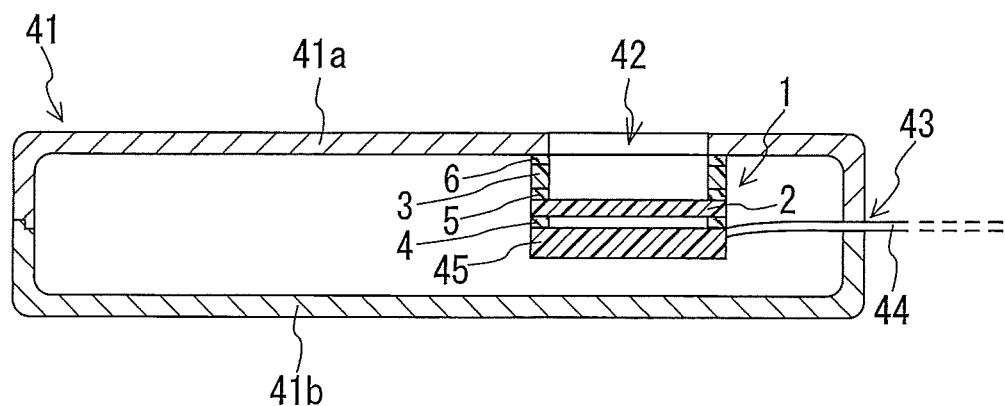
FIG. 7 is a schematic diagram illustrating a method for evaluating a waterproof sound-transmitting member used in each example.

First, as shown in FIG. 7, a simulated acrylic housing 41 (of 70 mm long, 50 mm wide, and 15 mm thick) intended to be used as a housing of a mobile phone was prepared. This simulated housing 41 was composed of a first portion 41a and a second portion 41b. The first portion 41a and the second portion 41b could be fitted together to form the housing 41. The first portion 41a was provided with a mounting hole 42. The simulated housing 41 was configured to form a space with no opening than the mounting hole 42 and a guide hole 43 for a lead wire 44 therein when the first portion 41a and the second portion 41b were fitted together.

Separately from this housing 41, the third double-sided adhesive tape (the first adhesive layer 4) of each of the waterproof sound-transmitting members obtained in Examples and Comparative Examples was attached to a speaker 45 (SCM-09C-J manufactured by Star Micronics Co., Ltd.) as a sound source.

Next, the speaker 45 with the waterproof sound-transmitting member attached thereto was fixed to the mounting hole 42 in the first portion 41a of the simulated housing 41 from the inner side of the first portion 41a, which served as a part of the inner surface of the housing 41 when the first portion 41a and the second portion 41b were fitted together, so that the waterproof sound-transmitting member faced and covered the mounting hole 42 from inside. The speaker 45 was fixed to the first portion 41a using the first double-sided adhesive tape (the third adhesive layer 6) provided on the opposite side of the waterproof sound-transmitting member from the speaker 45. In fixing the speaker 45, care was taken so that the mounting hole 42 be not overlapped with the first double-sided adhesive tape but be completely covered by the waterproof sound-transmitting member.

Next, the first portion 41a and the second portion 41b were fitted together while the lead wire 44 of the speaker 45 was led outside the simulated housing 41 through the guide hole 43. Thus, the simulated housing 41 having the waterproof sound-transmitting member mounted therein was prepared to measure the harmonic distortion of the waterproof sound-transmitting member. After the lead wire 44 was led outside, the guide hole 43 was sealed with putty.

Next, the lead wire 44 and a microphone (Type 2669 manufactured by B&K Corporation) were connected to an acoustic evaluation system (3560-B-030 manufactured by B&K Corporation), and the microphone was placed 50 mm away from the speaker 45.

The waterproof sound-transmitting member was mounted as described above, and then SSR (steady state response) analysis (test signal: 20 Hz to 20 kHz, sweep) was selected as the evaluation method of the acoustic evaluation system and performed so as to measure the harmonic distortion of the waterproof sound-transmitting member. More specifically, the harmonic distortion, which corresponded to the sum of all the 12th- to 100th-order harmonics included in sound with a fundamental frequency of 200 to 800 Hz, was measured.

For each of the waterproof sound-transmitting members, the storage modulus, loss modulus, loss factor, and harmonic distortion of the material of the support layer were measured as described above. The measurement results are shown in Table 1.

TABLE 1

| | Storage modulus (Pa) | Loss modulus (Pa) | Loss factor | Harmonic distortion (dB) |
|---|---|---|---|---|
| Example 1 | $2.16 \times 10^7$ | $2.65 \times 10^6$ | $1.23 \times 10^{-1}$ | 88 |
| Example 2 | $1.49 \times 10^7$ | $2.09 \times 10^6$ | $1.40 \times 10^{-1}$ | 89 |
| Example 3 | $1.93 \times 10^7$ | $2.83 \times 10^6$ | $1.46 \times 10^{-1}$ | 91 |
| Com. Example 1 | $5.25 \times 10^8$ | $2.15 \times 10^7$ | $4.09 \times 10^{-2}$ | 97 |
| Com. Example 2 | $7.47 \times 10^8$ | $4.01 \times 10^7$ | $5.37 \times 10^{-2}$ | 101 |
| Com. Example 3 | $1.18 \times 10^9$ | $6.23 \times 10^7$ | $5.28 \times 10^{-2}$ | 103 |

In Examples 1 to 3, the loss modulus of the material of the support layer is $1.0 \times 10^7$ Pa or less, the loss factor thereof is $1.0 \times 10^{-1}$ or more, and the harmonic distortion is low. In Comparative Examples 1 to 3, the loss modulus of the material of the support layer is more than $1.0 \times 10^7$ Pa, the loss factor thereof is less than $1.0 \times 10^{-1}$, and the harmonic distortion is higher. This reveals that the waterproof sound-transmitting members of Examples 1 to 3 each produce less distortion of sound than the waterproof sound-transmitting members of Comparative Examples 1 to 3.

The invention may be embodied in other forms without departing from the spirit or essential characteristics thereof. The embodiments disclosed in this specification are to be considered in all respects as illustrative and not limiting. The scope of the disclosure is indicated by the appended claims rather than by the foregoing description, and all changes which come within the meaning and range of equivalency of the claims are intended to be embraced therein.

INDUSTRIAL APPLICABILITY

The waterproof sound-transmitting member of the present invention can be suitably used in electronic devices having audio devices mounted therein. Specifically, the waterproof sound-transmitting member of the present invention can be suitably used in mobile phones, cordless phones, video cameras, digital cameras, IC recorders, portable music players, portable media players, portable game machines, personal digital assistants, speakers, headphones, microphones, etc.

What is claimed is:

1. A waterproof sound-transmitting member comprising:
   a waterproof sound-transmitting membrane; and
   a support layer joined to at least one surface of the waterproof sound-transmitting membrane,
   wherein the support layer comprises a polyolefin-based resin foam, and
   the support layer has a loss modulus of $1.0 \times 10^7$ Pa or less and a loss factor of $1.0 \times 10^{-1}$ or more.

2. The waterproof sound-transmitting member according to claim 1, wherein the support layer has an opening, and when a shortest line segment passing through a center of gravity of the opening and connecting two points on an inner periphery of the support layer surrounding the opening is defined as a first line segment and a line segment passing through the center of gravity of the opening, perpendicular to the first line segment, and connecting two points on the inner periphery of the support layer surrounding the opening is defined as a second line segment, the second line segment has a length at least twice a length of the first line segment.

3. The waterproof sound-transmitting member according to claim 2, wherein the inner periphery of the support layer surrounding the opening defines a rectangular region having first sides parallel to the first line segment and second sides parallel to the second line segment.

4. The waterproof sound-transmitting member according to claim 1, wherein an outer periphery of the support layer coincides with an outer periphery of the waterproof sound-transmitting membrane, as viewed in a direction in which sound is transmitted.

5. The waterproof sound-transmitting member according to claim 1, wherein the waterproof sound-transmitting membrane is a stretched porous polytetrafluoroethylene membrane.

6. The waterproof sound-transmitting member according to claim 1, wherein the support layer has a storage modulus of $1.49 \times 10^7$ Pa or more and $2.16 \times 10^7$ Pa or less, the support layer has the loss modulus of $2.09 \times 10^6$ Pa or more and $2.83 \times 10^6$ Pa or less, and the support layer has the loss factor of $1.23 \times 10^{-1}$ or more and $1.46 \times 10^{-1}$ or less.

7. The waterproof sound-transmitting member according to claim 1, wherein the polyolefin-based resin foam is a foam comprising, as a resin component, a mixture of a polyolefin resin and an elastomer component, and the elastomer component is rubber or thermoplastic elastomer.

* * * * *